(12) United States Patent
Vernon et al.

(10) Patent No.: US 9,869,105 B2
(45) Date of Patent: Jan. 16, 2018

(54) ALIGNMENT STRUCTURE FOR A WIRELESS CHARGING STATION

(71) Applicant: Ford Global Technologies, LLC, Dearborn, MI (US)

(72) Inventors: Leann Vernon, Dearborn, MI (US); Derek Hartl, Birmingham, MI (US); Raymond C. Siciak, Ann Arbor, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 306 days.

(21) Appl. No.: 14/793,182

(22) Filed: Jul. 7, 2015

(65) Prior Publication Data
US 2017/0009476 A1    Jan. 12, 2017

(51) Int. Cl.
*H02J 7/00* (2006.01)
*H02J 7/14* (2006.01)
*E04H 6/42* (2006.01)
*B60L 11/18* (2006.01)

(52) U.S. Cl.
CPC ............ *E04H 6/426* (2013.01); *B60L 11/182* (2013.01); *B60L 11/1809* (2013.01); *B60L 11/1816* (2013.01); *B60L 11/1827* (2013.01); *B60L 11/1838* (2013.01)

(58) Field of Classification Search
USPC ......................................... 320/108, 109, 107
See application file for complete search history.

(56) References Cited

U.S. PATENT DOCUMENTS

| | | | |
|---|---|---|---|
| 4,347,472 A | | 8/1982 | Lemelson |
| 5,821,731 A | * | 10/1998 | Kuki ................... B60L 11/1805 320/108 |
| 6,150,794 A | * | 11/2000 | Yamada ................ B60L 11/007 320/107 |
| 7,302,894 B2 | | 12/2007 | Belanger et al. |
| 8,937,454 B2 | | 1/2015 | Baarman et al. |

\* cited by examiner

*Primary Examiner* — Alexis Pacheco
(74) *Attorney, Agent, or Firm* — David Kelley; Brooks Kushman, P.C.

(57) ABSTRACT

A wheel guide for a vehicle charging station includes front and back sides, and a top extending between the front and back sides. The top defines an aperture sized to circumscribe a wireless transmitter of the charging station. The wheel guide further includes a pair of spaced apart wheel slots recessed into the top. Each wheel slot includes an entrance defined in the front side and a pair of longitudinal walls extending from the entrance toward the back side. At least a portion of each of the walls is configured such that a slope of the wall is shallowest at the entrance and becomes increasingly vertical in a direction towards the back side to guide a wheel of a vehicle towards a centerline of the slot.

19 Claims, 3 Drawing Sheets

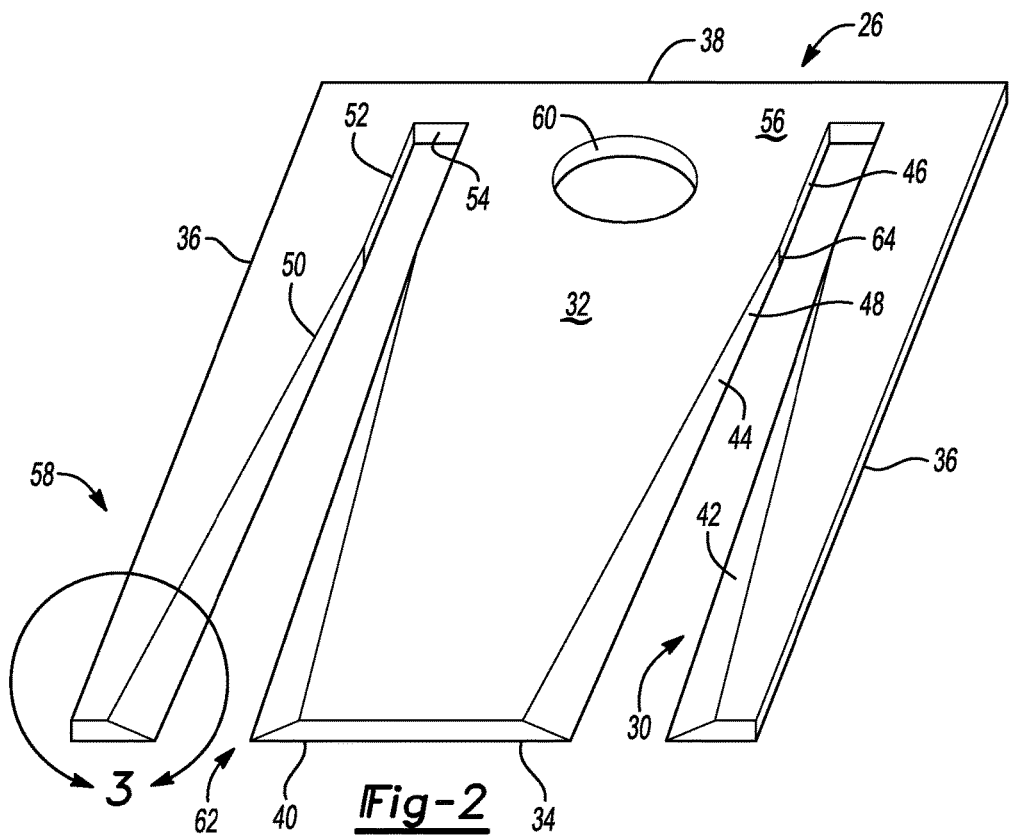
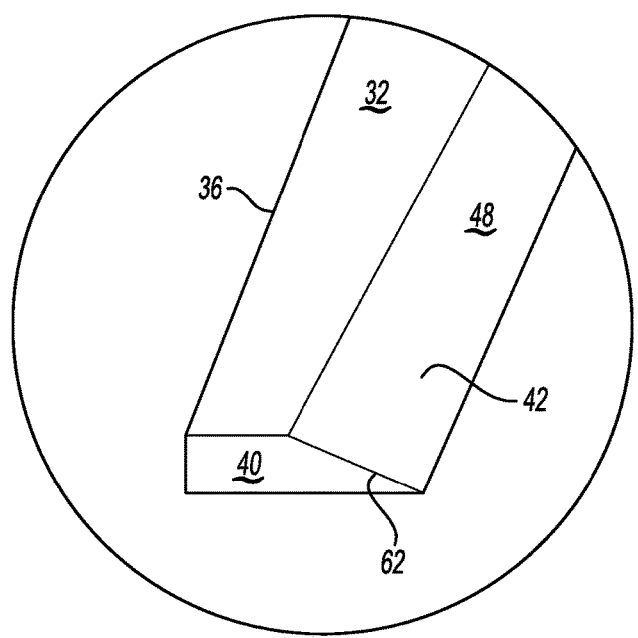

ALIGNMENT STRUCTURE FOR A WIRELESS CHARGING STATION

TECHNICAL FIELD

The present disclosure relates to alignment structures of wireless charging stations for hybrid electric and fully electric motor vehicles.

BACKGROUND

Battery electric vehicles (BEVs) and plug-in hybrid electric vehicles (PHEVs) contain a traction battery assembly that acts as an energy source for the vehicle. The traction battery includes components and systems to assist in managing vehicle performance and operations. BEVs and PHEVs are connectable to a charging station to recharge the battery using energy from the power grid or other external power source.

SUMMARY

According to one embodiment, a wheel guide for a vehicle charging station includes front and back sides, and a top extending between the front and back sides. The top defines an aperture sized to circumscribe a wireless transmitter of the charging station. The wheel guide further includes a pair of spaced apart wheel slots recessed into the top. Each wheel slot includes an entrance defined in the front side and a pair of longitudinal walls extending from the entrance toward the back side. At least a portion of each of the walls is configured such that a slope of the wall is shallowest at the entrance and becomes increasingly vertical in a direction towards the back side to guide a wheel of a vehicle towards a centerline of the slot.

According to another embodiment, a charging station for a vehicle includes a fork-shaped wheel alignment structure defining a pair of wheel slots each having a pair of guide walls extending from an entrance towards a terminal end. A portion of each of the walls is configured such that a slope of the wall is shallowest at the entrance and becomes increasingly vertical in a direction towards the terminal end. The charging station further includes a charging transmitter disposed below the alignment structure.

According to yet another embodiment, an alignment structure for a vehicle charging station includes a front and back, and a top extending therebetween. A wheel guide is recessed into the top and includes a pair of spaced apart longitudinal walls that each extend from the front towards the back. A portion of each of the walls is configured such that a slope of the wall is shallowest at the front and becomes increasingly vertical towards the back.

BRIEF DESCRIPTION OF THE DRAWINGS

FIG. 2 is a perspective view of an alignment structure for the charging system.

FIG. 3 is a magnified perspective view of a portion of the alignment structure.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Vehicles can be powered by only battery electricity (e.g. BEVs) or by a combination of power sources including battery electricity (e.g. PHEVs). For example, PHEVs are powered by both a traction battery and an internal combustion engine. During use of the vehicle, energy stored within the traction battery is discharged to power the electric motors. Periodically, the traction battery must be recharged to restore energy after a discharge cycle. The vehicle may be charged by a charging station that is electrically connected to the power grid or other external power source.

Figure 1:
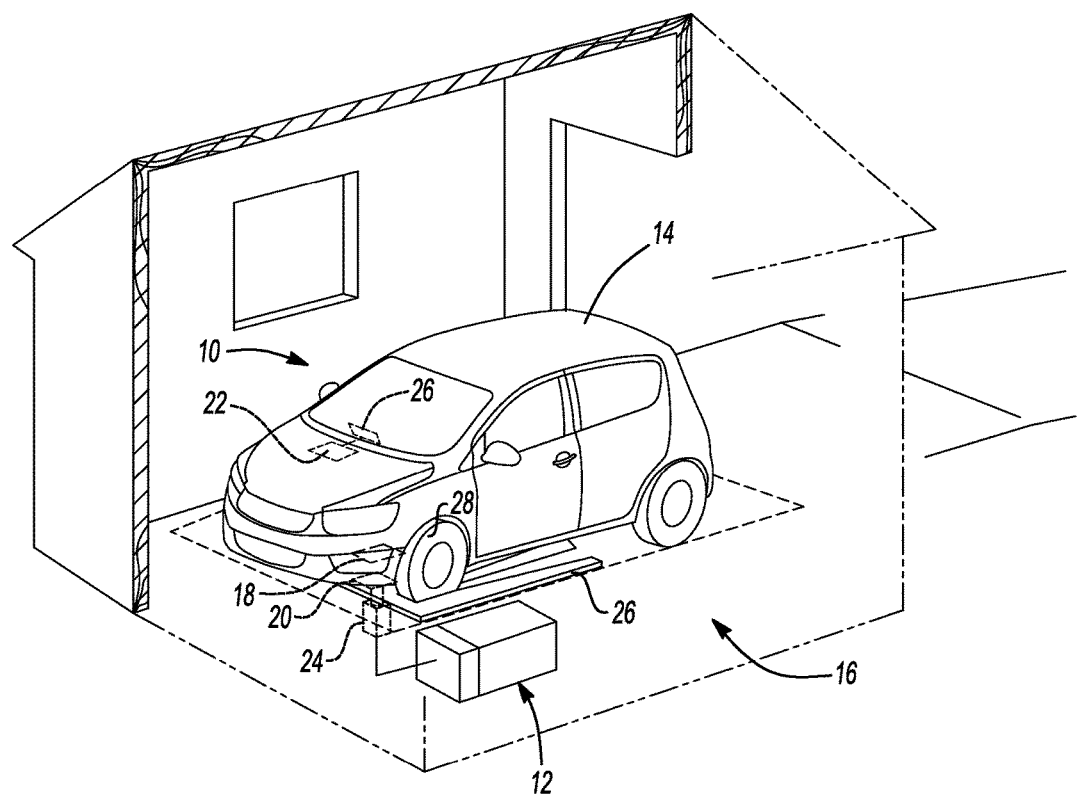
FIG. 1 is a diagrammatical perspective view of an example vehicle charging system.

Referring to FIG. 1, a vehicle charging system is illustrated in accordance with one or more embodiments and is generally referenced by numeral 10. Induction charging is used to provide power from a charging station 16 to a vehicle 14 in order to restore the battery. The vehicle 14 is shown as docked at the charging station 16. The charging station includes a vehicle charger 12. The vehicle charger 12 is connected to, and receives energy from, the power grid or other power source (e.g. local solar power).

The vehicle 14 includes a secondary coil housed within an induction charging plate 18 disposed on the underside of the vehicle 14. The vehicle secondary induction charging plate 18 is electrically connected to the traction battery of the vehicle 14. The vehicle 14 also includes an alternating current (AC) to direct current (DC) power converter in order to rectify and filter the AC power received from the vehicle charger 12 into DC power to be received by the battery. The vehicle charger 12 may be disposed in the garage floor beneath the vehicle 14 or may be on one of the walls of the garage. The charger 12 includes a primary charging coil housed within a corresponding primary induction charging plate 20. The primary induction charging plate 20 can be generally horizontal and vertical offset from the vehicle secondary induction charging plate 18. For example, when in the charging position, the plate 18 may be above the plate 20. In some embodiments, the plate 20 is a wireless-power transmitter and the plate 18 is a wireless-power receiver. The primary induction charging plate 20 can be adjustable in height to create a suitable gap between the plates (18, 20) to facilitate charging of the vehicle 14. Electrical current is provided to the primary coil, which generates an electromagnetic field around the primary induction charging plate 20. When the vehicle secondary induction charging plate 18 is in proximate relation to the powered primary induction plate 20, it receives power by being within the generated electromagnetic field. Current is induced in the secondary coil and subsequently transferred to the vehicle battery to recharge the battery. The gap between the plates allows for variation in vehicle alignment, and also for accommodation of alternate authorized vehicles with differing ride heights.

In an alternative embodiment (not shown), the primary induction charging plate is configured to be in a generally upright position—for example, on or near a wall. The vehicle has a corresponding secondary induction charging plate on a front or rear vertical portion, such as on a front or rear bumper. The primary and secondary induction charging plates come in to a proximate relation when the vehicle is driven to the charge station, and parked in a designated charging position.

The vehicle 14 is provided with a controller 22. Although it is shown as a single controller, the vehicle controller 22 can include multiple controllers that are used to control multiple vehicle systems. For example, the vehicle controller 22 can be a vehicle system controller/powertrain control module (VSC/PCM). In this regard, the vehicle charging control portion of the VSC/PCM can be software embedded within the VSC/PCM, or it can be a separate hardware device. The vehicle controller 22 generally includes any number of microprocessors, ASICs, ICs, memory (e.g., FLASH, ROM, RAM, EPROM and/or EEPROM) and software code to co-act with one another to perform a series of operations. A microprocessor within the vehicle controller 22 further includes a timer to track given time intervals between a time reference and selected events. Designated intervals are programmed such that the controller provides certain commands signals and monitors given inputs at selectable time intervals. The vehicle controller is in electrical communication with the vehicle battery, and receives signals to indicate the battery charge level. The vehicle controller 22 further communicates with other controllers over a hardline vehicle connection using a common bus protocol (e.g., CAN), and also employs wireless communication.

The vehicle charger 12 is provided with a charger controller 24 having wireless communication means. The charger controller 24 similarly has embedded software and is programmable to regulate power flow provided by the vehicle charger 12. Software included with the charger controller 24 may include a timer to track elapsed time between designated events. Under selected conditions, or upon the receipt of designated instructions, the charger controller 24 can enable, disable, or reduce power flow through the charger 12. The vehicle charger 12 is configured to receive signals indicative of charge instructions from the vehicle controller 22.

The charging station 16 also includes a wheel alignment structure or wheel guide 26 used to properly align the charging plate 18 on the vehicle 14 with the charging plate 20 of the charging station 16. The guide 26 is used to properly aligning the front wheels 28 of the vehicle 14 relative to the charging plate 20 to ensure consistent and proper charging of the vehicle 14.

FIGS. 2 and 3 illustrate the alignment structure or guide 26 according to one or more embodiments. The guide 26 includes a top 32, a bottom 34, longitudinal sides 36, a backside 38, and an entrance side of 40. The guide 26 also includes a pair of wheel slots or guides 26 that extend forward from the entrance side 40 towards the backside 38. The longitudinal centerline of the slots 30 may be substantially parallel to the longitudinal sides 36. Each of the wheels slots 30 may extend completely through the guide 26 and have an inner longitudinal wall 44 extending between the top 32 and the bottom 34, and an outer longitudinal wall 42 that also extends between the top 32 and the bottom 34. In some embodiments, the wheel slots may not extend completely through the guide 26. Rather, the wheel slots 30 are recessed into the top 32 and have a depth less than the height of the guide 26. Each of the slots 30 may include a straight portion 52 generally disposed in a landing area 56 of the guide 26, and a tapered portion 50 disposed in an entrance region 58. Within the straight portion 52, the inner and outer walls 42, 44 are uniformly spaced apart from one another. Within the tapered portion 50, the distance between the inner and outer walls 42, 44 varies along the longitudinal centerline of the slot 30. The distance between the inner and outer walls 42, 44 is greatest at the entrance 62 of the slot 30, which is located at the entrance side 40 of the guide 26. The inner and outer walls 42, 44 taper inwardly (i.e. towards each other) and the distance between the walls 42, 44 gradually decreases in a forward direction of the slot 30 (i.e. from the entrance side 40 towards the backside 38). Each of the walls 42, 44 has a transition point 64 where the taper stops and the walls extend substantially parallel to each other. The transition point 64 is located where the tapered section 50 and the straight section 52 join.

The outer wall 42 may include a vertical face 46 within the straight section 52 and a sloped face 48 within the tapered section 50. The slope of the sloped face 48 is shallowest at the entrance 62 of the tapered portion 50. The sloped face 48 becomes increasingly vertical in the forward direction. At the transition point 64, the sloped face 48 is substantially vertical to match the vertical face 46. The sloped face 48 may have a slope between 10 and 30 degrees relative to the ground at the entrance side 40 and gradually increase to around 90 degrees (i.e. vertical) at the start of the straight portion 52. The inner wall 44 may be designed as described above with regards to the outer wall 42.

The slot 30 is tapered at the entrance 62 to more easily guide the vehicle wheels 28 into the slots 30. The width of the slots 30 at the entrance side 40 may be two or three times the width of the wheels 28 of the vehicle 14. The slot 30—within the tapered portion 50—gradually narrows to a width that approximates the width of the wheel 28, albeit slightly larger. For example, the width of the slot in the straight portion 52 may be 5 to 25% wider than the width of the wheel 28.

The taper of the slots 30 cooperates with the sloped faces 48 of the walls 42, 44 to help guide the vehicle 14 into proper alignment with the transmitter 20. The sloped faces 48 have at least two mechanisms to guide the wheels 28 towards the centerline of the slots 30. First, the sloped faces 48 may cause the wheels 28 to slide down the sloped face 48 towards the centerline of the slot 30. The gradual increase in the slope of the sloped face 48 further facilitates sliding of the wheel 28 by providing increased lateral reactionary forces on the wheel. Second, the sloped faces provide feedback to the driver of the vehicle 14 and alert them that they need to steer the vehicle towards the centerline of the slot 30. For example, as the wheel 28 progresses forward along the sloped face 48, the increasingly vertical slope provides more and more feedback to the driver helping the driver steer the wheels into the correct alignment within the slots 30. While the sidewalls 42, 44 of the slots transversely position the vehicle 14 relative to the transmitter 20, the traverse wall 54 longitudinally positions the vehicle 14.

The dimensions of the guide 26 will vary according to the vehicle 14. An example vehicle 14 may be designed to have the charging plate 18 disposed just behind the front axle. Here, the longitudinal sides 36 may extend from just in front of the front axle to around the B-pillar of the vehicle 14. The distance between the pair of slots 30 depends upon the track width of the front wheels 28. The distance between the slots may be adjustable to accommodate various vehicle models. The thickness between the top 32 and bottom 34 (i.e. height) of the guide 26 may vary between 2 to 10 inches depending upon the vehicle 14 and the desired distance between the plates 18, 20. The guide 26 may be made out of metal or a composite material. In some embodiments, the guide 26 may include anchors to securely position the guide 26 to the floor. The anchors may be fasteners or a non-skid finish on the bottom 34.

Figure 4:
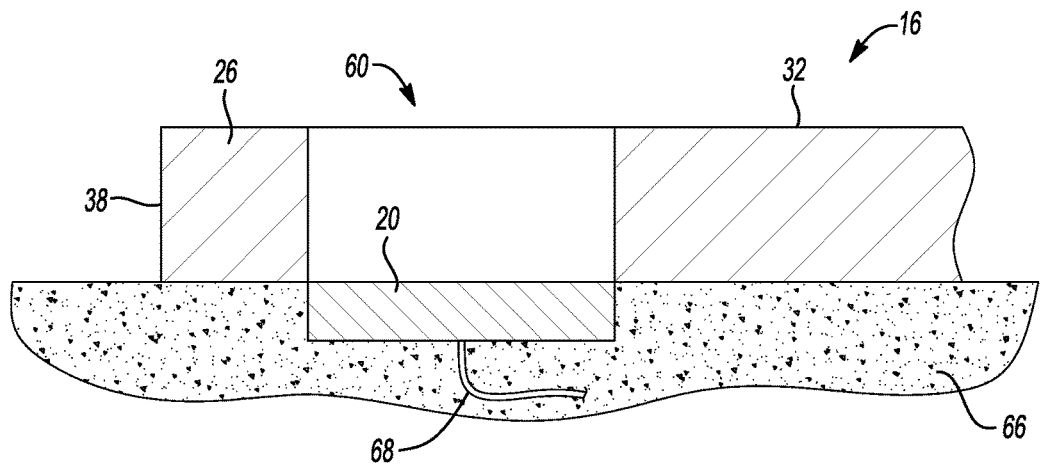
FIG. 4 is a side view, in cross-section, of the vehicle charging system according to one embodiment.

Referring to FIG. 4, in one example charging station 16, the transmitter 20 is disposed in or under the concrete or dirt floor 66. The guide 26 is positioned on top of the floor 66. The guide 26 includes a hole (aperture) 60 that is positioned over the transmitter 20. The hole 60 allows the wireless signal to be transmitted from the transmitter 20 to the receiver 18 on the vehicle 14. The hole 60 is sized to circumscribe the transmitter 20. The transmitter 20 may be connected to the charger 12 via one or more wires 68.

Figure 5:
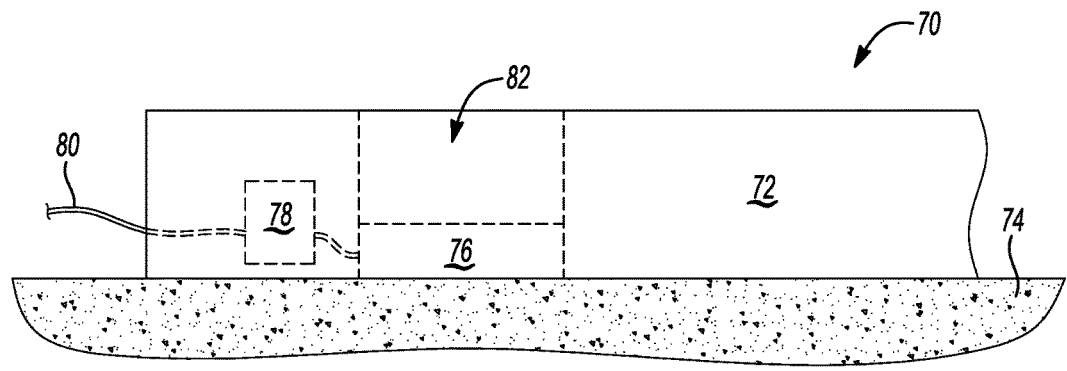
FIG. 5 is a side view of the vehicle charging system according to another embodiment.

Referring to FIG. 5, another charging station 70 is illustrated. The charging station 70 includes an alignment structure or guide 72 that is disposed on the floor 74. In this charging station, the transmitter 76 is disposed within the guide 72. The guide 72 may have additional height to fit the transmitter 76 and electronics 78. The electronics 78 may be connected to the charger via one or more wires 80. The guide 72 may include a hole 82 disposed above the transmitter 76 to allow proper communication between the transmitter 76 and the receiver 18 of the vehicle. The guide 72 may include wheel slots that are similar to the wheels slots 30 of guide 26.

An example pull-in procedure will now be described with reference to FIGS. 1 and 2. The guide 26 is positioned on the floor in proper alignment with the transmitter 20, which may be on the floor or on the wall. The guide is positioned such that the entrance side 40 faces the garage door opening. Upon pulling into the garage, the vehicle 14 approaches the guide 26 in forward drive (i.e. not in reverse). The driver attempts to position the front wheels 28 on the centerline of the slots 30 and the wheels 28 enter into the tapered portion 50 of the slots as the vehicle advances forward. Depending upon the driver's skill, the wheels 28 may be properly aligned and on the floor, or may be partially on the inner or outer walls 42, 44. The walls of each slot 30 cooperate with each other to guide the wheels 28 towards the centerline of the slots 30 as the driver continues to pull the vehicle forward towards the backside 38 of the guide 26. As the driver continues to pull forward, the wheels 28 contact the traverse walls 54 signaling the driver to stop forward motion and park the vehicle 14. In a correctly parked position, each of the wheels 28 is disposed between the inner and outer walls 42, 44 of the straight portion 52 and the front edge of the tire is resting against, or near, the traverse wall 54.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A wheel guide for a vehicle charging station comprising:
   front and back sides;
   a top extending between the front and back sides and defining an aperture sized to circumscribe a wireless transmitter of the charging station; and
   a pair of spaced apart wheel slots recessed into the top and each including an entrance defined in the front side and a pair of longitudinal walls extending from the entrance toward the back side, wherein at least a portion of each of the walls is sloped such that a slope of the wall becomes increasingly vertical in a direction towards the back side to guide a wheel of a vehicle towards a centerline of the slot.

2. The wheel guide of claim 1 wherein each of the wheel slots includes a tapered portion, near the front side, in which the longitudinal walls are offset at a variable horizontal width and a uniform portion, near the backside, in which the longitudinal walls are offset at a substantially constant horizontal width.

3. The wheel guide of claim 2 wherein the slope of the wall is variable in the tapered portion and substantially constant and vertical in the uniform portion.

4. The wheel guide of claim 1 wherein each of the wheel slots further includes an end wall extending between the longitudinal walls.

5. The wheel guide of claim 1 wherein the longitudinal walls vertically extend between the top and a bottom of the wheel guide.

6. A charging station for a vehicle comprising:
   a fork-shaped wheel alignment structure defining a pair of wheel slots each having a pair of guide walls extending from an entrance towards a terminal end, wherein a portion of each of the walls is configured such that a slope of the wall is shallowest at the entrance and becomes increasingly vertical in a direction towards the terminal end; and
   a charging transmitter disposed below the alignment structure.

7. The charging station of claim 6 wherein each of the wheel slots includes a tapered portion, near the entrance, in which the guide walls are offset at a variable horizontal width and a uniform portion, near a backside, of the alignment structure in which the guide walls are offset at a substantially constant horizontal width.

8. The charging station of claim 7 wherein the slope of the wall is variable in the tapered portion and substantially constant and vertical in the uniform portion.

9. The charging station of claim 6 wherein the alignment structure defines an aperture and wherein the charging transmitter is disposed below and circumscribed by the aperture.

10. The charging station of claim 6 wherein each of the guide walls vertically extends between a top and a bottom of the alignment structure.

11. The charging station of claim 6 wherein the alignment structure defines an aperture positioned to permit an inductive charging signal of the charging transmitter to pass therethrough.

12. The charging station of claim 6 wherein the charging transmitter is disposed in the alignment structure.

13. The charging station of claim 12 wherein the alignment structure defines an aperture positioned above the charging transmitter and configured to permit an inductive charging signal to pass therethrough.

14. The charging station of claim 12 further comprising a charger electrically connected to a power grid and configured to send power to the charging transmitter.

15. An alignment structure for a vehicle charging station comprising:
   a front and back, and a top extending therebetween; and
   a wheel guide recessed into the top and including a pair of spaced apart longitudinal walls that each extend from the front towards the back, wherein a portion of each of the walls is sloped such that a slope of the wall is shallowest at the front and becomes increasingly vertical towards the back.

16. The alignment structure of claim 15 wherein each of the wheel guides includes a tapered portion, near the front, in which the longitudinal walls extend towards each other in a forward direction and a uniform portion, near the back, in which the longitudinal walls have a constant lateral spacing relative to each other.

17. The alignment structure of claim 16 wherein the slope of the wall is variable in the tapered portion and constant and vertical in the uniform portion.

18. The alignment structure of claim 15 wherein the top defines an aperture sized to circumscribe a wireless transmitter of the charging station.

19. The alignment structure of claim 15 further comprising a wireless charging transmitter disposed between the top and a bottom of the alignment structure.

* * * * *